(12) United States Patent
DiBenedetto

(10) Patent No.: US 12,215,715 B1
(45) Date of Patent: Feb. 4, 2025

(54) ENGINE TRIM BALANCE SYSTEM

(71) Applicant: RTX CORPORATION, Farmington, CT (US)

(72) Inventor: Enzo DiBenedetto, Berlin, CT (US)

(73) Assignee: RTX CORPORATION, Farmington, CT (US)

( * ) Notice: Subject to any disclaimer, the term of this patent is extended or adjusted under 35 U.S.C. 154(b) by 32 days.

(21) Appl. No.: 18/229,967

(22) Filed: Aug. 3, 2023

(51) Int. Cl.
*F04D 29/66* (2006.01)
*F16F 15/32* (2006.01)

(52) U.S. Cl.
CPC .......... *F04D 29/662* (2013.01); *F16F 15/322* (2013.01)

(58) Field of Classification Search
CPC ....... F04D 29/662; F16F 15/322; F01D 5/027
See application file for complete search history.

(56) References Cited

U.S. PATENT DOCUMENTS

| | | | | |
|---|---|---|---|---|
| 1,730,019 | A | * | 10/1929 | Trumpler ............... G01M 1/04 73/469 |
| 5,167,167 | A | * | 12/1992 | Tiernan, Jr. ............. F16F 15/32 73/470 |
| 7,296,976 | B2 | | 11/2007 | Roever et al. |
| 8,668,457 | B2 | | 3/2014 | Juh |
| 9,279,324 | B2 | | 3/2016 | Clute et al. |
| 9,404,367 | B2 | | 8/2016 | Muscat et al. |
| 11,326,454 | B2 | | 5/2022 | Rosborough |
| 2006/0053882 | A1 | | 3/2006 | Lee et al. |

FOREIGN PATENT DOCUMENTS

EP 1793082 A2 6/2007
EP 1683942 B1 4/2009

* cited by examiner

*Primary Examiner* — Michael L Sehn
(74) *Attorney, Agent, or Firm* — Carlson, Gaskey & Olds, P.C.

(57) ABSTRACT

A balancing system includes a rotor hub having a center axis and a balancing ring surrounding the rotor hub. The balancing ring includes a plurality of ring teeth. A pinion gear includes a plurality of gear teeth in meshing engagement with the plurality of ring teeth, wherein the pinion gear is selectively rotated to adjust a position of the balancing ring relative to the rotor hub.

20 Claims, 4 Drawing Sheets

ENGINE TRIM BALANCE SYSTEM

STATEMENT REGARDING FEDERALLY SPONSORED RESEARCH OR DEVELOPMENT

This invention was made with Government support under Contract 80GRC021N0001 awarded by the National Aeronautics & Space Administration. The Government has certain rights in this invention.

BACKGROUND

This application relates to structure for balancing a rotor.

Gas turbine engines include rotating components such as bladed rotors that rotate about an engine center axis. These rotors are typically balanced during engine assembly to minimize vibration. Many balancing systems cannot be easily accessed for adjustment after engine assembly. Additionally, balancing systems can create a heated air windage effect that reduces engine efficiency.

SUMMARY OF THE INVENTION

In a featured embodiment, a balancing system includes a rotor hub having a center axis, and a balancing ring surrounding the rotor hub, the balancing ring including a plurality of ring teeth. A pinion gear includes a plurality of gear teeth in meshing engagement with the plurality of ring teeth, and wherein the pinion gear is selectively rotated to adjust a position of the balancing ring relative to the rotor hub.

In another embodiment according to the previous embodiment, the balancing ring has a first portion defining a first weight characteristic and a second portion defining a second weight characteristic that is greater than the first weight characteristic.

In another embodiment according to any of the previous embodiments, the balancing ring has an inner peripheral surface, and wherein the first portion comprises a section of the balancing ring where a portion of the inner peripheral surface is spaced from an outer peripheral surface of the rotor hub by a gap, and wherein the second portion comprises a section of the balancing ring that does not include the gap.

In another embodiment according to any of the previous embodiments, the first portion extends circumferentially around the center axis for a first arc length and the second portion extends circumferentially around the center axis for a second arc length that is less than the first arc length.

In another embodiment according to any of the previous embodiments, the pinion gear is selectively moveable between a locked position where the balancing ring is prevented from rotating and an unlocked position where the balancing ring can rotate relative to the rotor hub.

In another embodiment according to any of the previous embodiments, the rotor hub includes a first set of lock features, and wherein the pinion gear includes a second set of lock features that engage with the first set of lock features when the pinion gear is in the locked position.

In another embodiment according to any of the previous embodiments, the pinion gear is resiliently biased to the locked position.

In another embodiment according to any of the previous embodiments, the rotor hub comprises a compressor rotor hub and includes a shelf having outer surface that extends to a shelf edge, and including a cover that extends to a cover edge that is generally flush with the shelf edge, and wherein the pinion gear does not extend radially outward of the shelf or cover.

In a featured embodiment, a gas turbine includes a compressor section, a combustor, and a turbine section, the compressor section having at least one compressor rotor comprising a hub supporting at least one row of blades for rotation about an engine center axis. A balancing ring surrounds the hub and includes a plurality of ring teeth. A pinion gear includes a plurality of gear teeth in meshing engagement with the plurality of ring teeth, and wherein the pinion gear is selectively rotated to adjust a position of the balancing ring relative to the hub.

In another embodiment according to any of the previous embodiments, the pinion gear is selectively moveable between a locked position where the balancing ring is prevented from rotating and an unlocked position where the balancing ring can rotate relative to the hub, and wherein the pinion gear is resiliently biased to the locked position.

In another embodiment according to any of the previous embodiments, the hub includes a shelf having an outer surface that extends to a shelf edge, and including a cover that extends to a cover edge that is generally flush with the shelf edge, and wherein the pinion gear includes a first set of lock features and the shelf and cover provide a second set of lock features that receive the first set of lock features with the pinion gear is in the locked position, and wherein the pinion gear does not extend radially outward of the shelf or cover when in the locked position.

In another embodiment according to any of the previous embodiments, said pinion gear is pushed radially inwardly in response to a tool input force against a biasing force such that the first set of lock features disengages from the second set of lock features to allow the pinion gear to rotate the balancing ring to a desired adjustment position.

In another embodiment according to any of the previous embodiments, the gas turbine engine further includes a capture plate and retainer to hold the cover on the hub, wherein one of the cover and the capture plate includes protrusions and the other of the cover and the capture plate includes recesses to receive the protrusions.

In another embodiment according to any of the previous embodiments, the balancing ring has a first portion defining a first weight characteristic and a second portion defining a second weight characteristic that is greater than the first weight characteristic such that a center of the balancing ring is offset from the engine center axis.

In another embodiment according to any of the previous embodiments, the gas turbine engine further includes an engine casing extending around the at least one compressor rotor, and wherein the pinion gear is accessible through an access port formed within the engine casing.

In a featured embodiment, a method includes installing a balancing ring to surround a rotor hub that rotates about a center axis, engaging gear teeth of a pinion gear with ring teeth on the balancing ring, and selectively rotating the pinion gear to adjust a position of the balancing ring relative to the rotor hub.

In another embodiment according to any of the previous embodiments, the method further includes moving the pinion gear from a locked position where the pinion gear is prevented from rotating to an unlocked position to allow the pinion gear to rotate the balancing ring to a desired adjustment position.

In another embodiment according to any of the previous embodiments, the method further includes accessing the pinion gear through an access port provided on an engine casing that surrounds the rotor hub.

In another embodiment according to any of the previous embodiments, the method further includes offsetting a center of the balancing ring from the center axis.

In another embodiment according to any of the previous embodiments, the method further includes rotating the pinion gear about an axis that is non-concentric with the center axis, installing a cover on the rotor hub, and installing a retainer to hold the cover on the rotor hub such that an edge of the cover is flush with an edge on the rotor hub and such that the pinion gear does not extend radially outward of the rotor hub or cover.

The present disclosure may include any one or more of the individual features disclosed above and/or below alone or in any combination thereof.

These and other features of the present invention can be best understood from the following specification and drawings, the following of which is a brief description.

DETAILED DESCRIPTION

Figure 1:
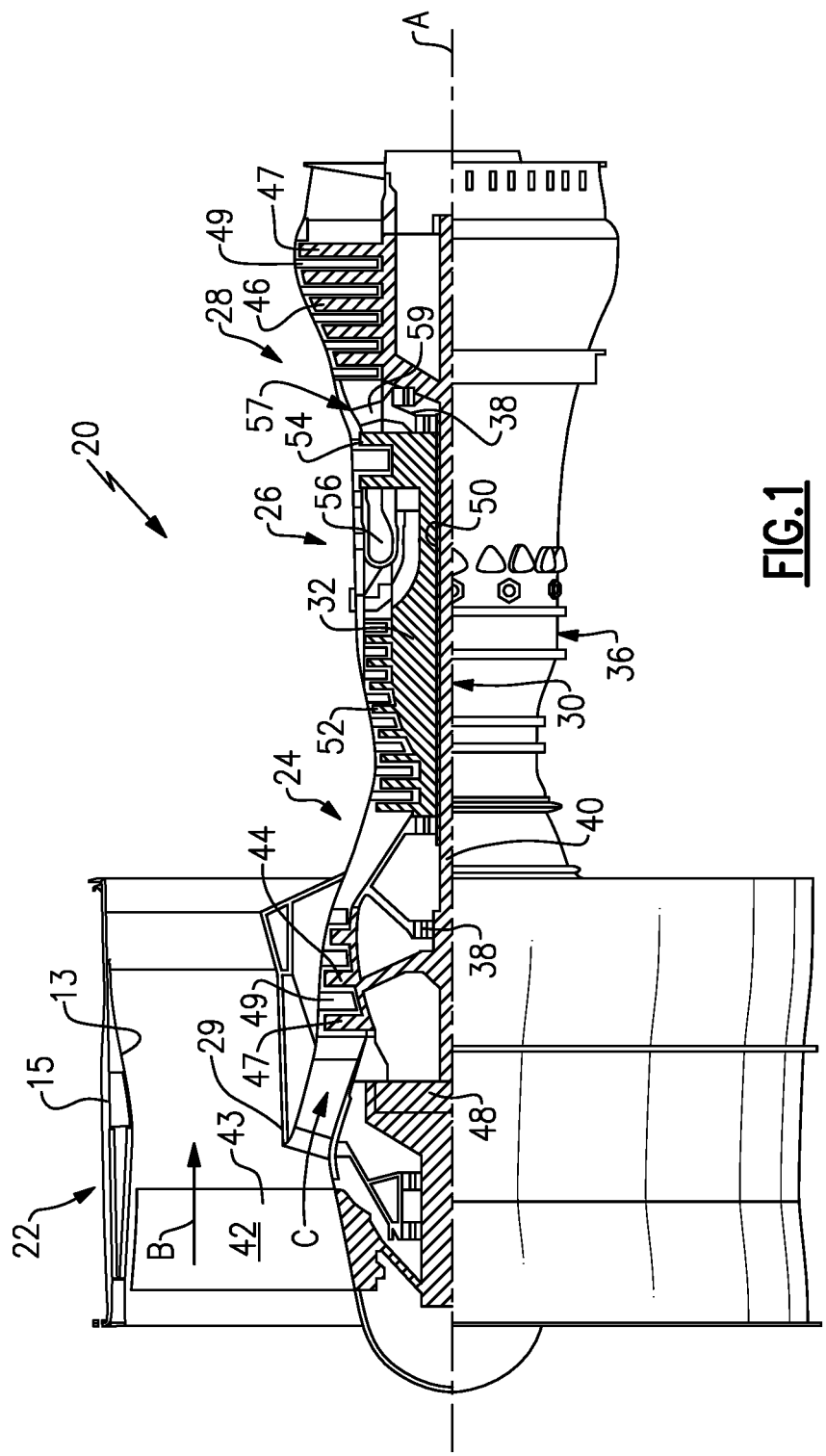
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The fan 42 may have at least 10 fan blades 43 but no more than 20 or 24 fan blades 43. In examples, the fan 42 may have between 12 and 18 fan blades 43, such as 14 fan blades 43. An exemplary fan size measurement is a maximum radius between the tips of the fan blades 43 and the engine central longitudinal axis A. The maximum radius of the fan blades 43 can be at least 40 inches, or more narrowly no more than 75 inches. For example, the maximum radius of the fan blades 43 can be between 45 inches and 60 inches, such as between 50 inches and 55 inches. Another exemplary fan size measurement is a hub radius, which is defined as distance between a hub of the fan 42 at a location of the leading edges of the fan blades 43 and the engine central longitudinal axis A. The fan blades 43 may establish a fan hub-to-tip ratio, which is defined as a ratio of the hub radius divided by the maximum radius of the fan 42. The fan hub-to-tip ratio can be less than or equal to 0.35, or more narrowly greater than or equal to 0.20, such as between 0.25 and 0.30. The combination of fan blade counts and fan hub-to-tip ratios disclosed herein can provide the engine 20 with a relatively compact fan arrangement.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The low pressure compressor 44 and low pressure turbine 46 can include an equal number of stages. For example, the engine 20 can include a three-stage low pressure compressor 44, an eight-stage high pressure compressor 52, a two-stage high pressure turbine 54, and a three-stage low pressure turbine 46 to provide a total of sixteen stages. In other examples, the low pressure compressor 44 includes a different (e.g., greater) number of stages than the low pressure turbine 46. For example, the engine 20 can include a five-stage low pressure compressor 44, a nine-stage high pressure compressor 52, a two-stage high pressure turbine 54, and a four-stage low pressure turbine 46 to provide a total of twenty stages. In other embodiments, the engine 20 includes a four-stage low pressure compressor 44, a nine-stage high pressure compressor 52, a two-stage high pressure turbine 54, and a three-stage low pressure turbine 46 to provide a total of eighteen stages. It should be understood that the engine 20 can incorporate other compressor and turbine stage counts, including any combination of stages disclosed herein.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(Tram\ °R)/(518.7°\ R)]^{0.5}$. The corrected fan tip speed can be less than or equal to 1150.0 ft/second (350.5 meters/second), and can be greater than or equal to 1000.0 ft/second (304.8 meters/second).

The fan 42, low pressure compressor 44 and high pressure compressor 52 can provide different amounts of compression of the incoming airflow that is delivered downstream to the turbine section 28 and cooperate to establish an overall pressure ratio (OPR). The OPR is a product of the fan pressure ratio across a root (i.e., 0% span) of the fan blade 43 alone, a pressure ratio across the low pressure compressor 44 and a pressure ratio across the high pressure compressor 52. The pressure ratio of the low pressure compressor 44 is measured as the pressure at the exit of the low pressure compressor 44 divided by the pressure at the inlet of the low pressure compressor 44. In examples, a sum of the pressure ratio of the low pressure compressor 44 and the fan pressure ratio is between 3.0 and 6.0, or more narrowly is between 4.0 and 5.5. The pressure ratio of the high pressure compressor 52 is measured as the pressure at the exit of the high pressure compressor 52 divided by the pressure at the inlet of the high pressure compressor 52. In examples, the pressure ratio of the high pressure compressor 52 is between 9.0 and 12.0, or more narrowly is between 10.0 and 11.5. The OPR can be equal to or greater than 45.0, and can be less than or equal to 70.0, such as between 50.0 and 60.0. The overall and compressor pressure ratios disclosed herein are measured at the cruise condition described above, and can be utilized in two-spool architectures such as the engine 20 as well as three-spool engine architectures.

The engine 20 establishes a turbine entry temperature (TET). The TET is defined as a maximum temperature of combustion products communicated to an inlet of the turbine section 28 at a maximum takeoff (MTO) condition. The inlet is established at the leading edges of the axially forwardmost row of airfoils of the turbine section 28, and MTO is measured at maximum thrust of the engine 20 at static sea-level and 86 degrees Fahrenheit (° F.). The TET may be greater than or equal to 2700.0° F., or more narrowly less than or equal to 3500.0° F., such as between 2750.0° F. and 3350.0° F. The relatively high TET can be utilized in combination with the other techniques disclosed herein to provide a compact turbine arrangement.

The engine 20 establishes an exhaust gas temperature (EGT). The EGT is defined as a maximum temperature of combustion products in the core flow path C communicated to at the trailing edges of the axially aftmost row of airfoils of the turbine section 28 at the MTO condition. The EGT may be less than or equal to 1000.0° F., or more narrowly greater than or equal to 800.0° F., such as between 900.0° F. and 975.0° F. The relatively low EGT can be utilized in combination with the other techniques disclosed herein to reduce fuel consumption.

Figure 2:
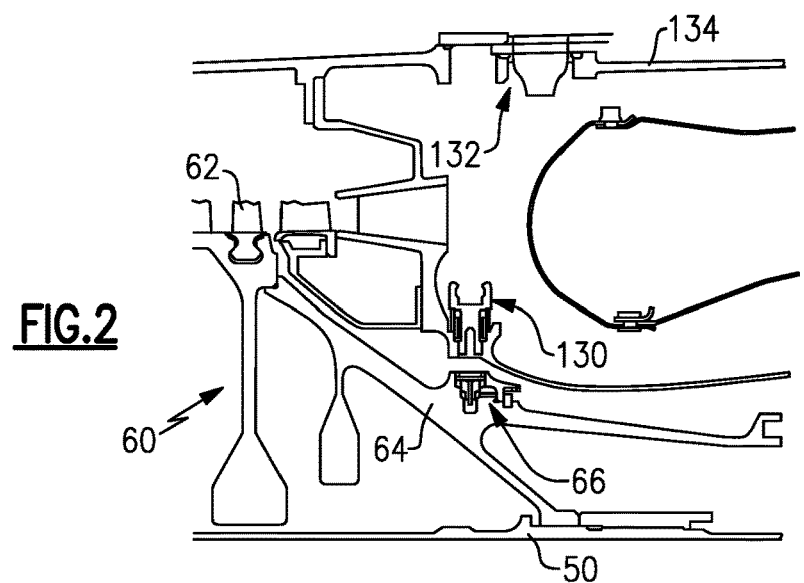
FIG. 2 is a section view of a rotor including a balancing system according to the disclosure.

The example engine 20 described above with regard to FIG. 1 may include a balancing system to minimize vibrations. FIG. 2 shows an example of a rotor disk 60 including one or more rows of blades 62 supported on a rotor hub 64, as part of a high pressure compressor 52, for rotation about the center axis A. In one example, the rotor 60 comprises a HPC rotor supported on a rotor hub 64, that is coupled to the router shaft 50. A balancing system 66 is used to balance the rotor 60 to minimize vibrations. In one example, the balancing system 66 is mounted to the rear HPC hub 64 at a location that is aft of the blades 62, and which has an increased thickness portion for greater support. The balancing system 66 could also be used at other rotor locations.

Figure 3:
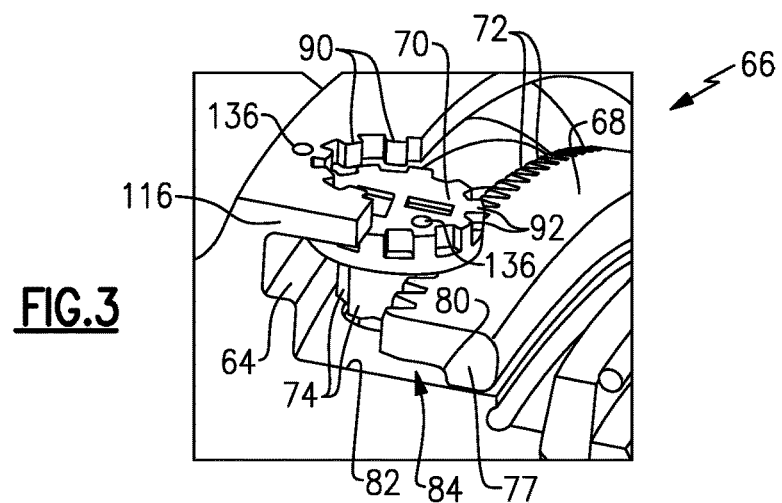
FIG. 3 is an enlarged perspective view of the balancing system of FIG. 2 with a pinion gear and balancing ring as installed on a rotor hub, the pinion gear being in an unlocked position.

In one example, the balancing system 66 comprises a balancing ring 68 and a pinion gear 70 as shown in FIG. 3. The balancing ring 68 is configured to surround the hub 64 and includes a plurality of ring teeth 72. The pinion gear 70 includes a plurality of gear teeth 74 that are in meshing engagement with the plurality of ring teeth 72. In one example, the pinion gear 70 is selectively rotated to adjust a position of the balancing ring 68 relative to the hub 64 via the meshing engagement.

Figure 4:
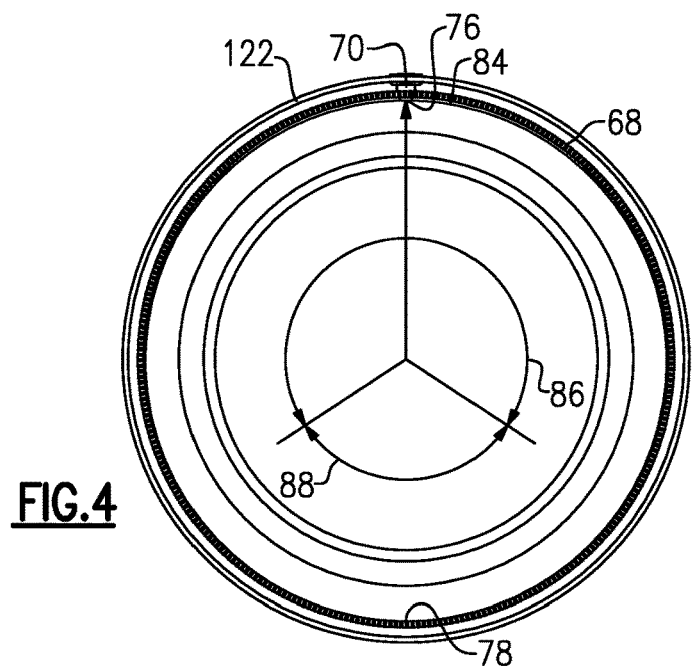
FIG. 4 is a section view taken along A-A as identified in FIG. 3, where the section view is aft looking toward a forward end of a gas turbine engine.

In one example, shown in FIG. 4, the balancing ring 68 has a first portion 76 defining a first weight characteristic and a second portion 78 defining a second weight characteristic that is greater than the first weight characteristic. In one example, the balancing ring 68 has an inner peripheral surface 80, and the balancing ring 68 further comprises a section of the balancing ring 68 where a portion of the inner peripheral surface 80 is spaced from an outer peripheral surface 82 of the hub 64 by a gap 84 (FIG. 3). In the same example, the second portion 78 comprises a section of the balancing ring 68 where there is no gap 84. Gap 84 at location 76 transitions to no gap at location 78. The gap can transition linearly or by another shape. The balancing ring 68 is always piloted at a rear area 77, while the balancing ring 68 is not piloted where there is the gap 84. The second portion 78 is fully piloted as there is no gap 84.

This is best shown in FIG. 4 where an upper portion of the balancing ring 68 comprises the first portion 76 that is spaced from the hub 64 by the gap 84, and the lower portion of the balancing ring 68 comprises the second portion 78 that does not include the gap 84 between the ring 68 and the hub 64. In one example, the upper portion, comprising the first portion 76, extends circumferentially around the center axis A for a first arc length 86, and the lower portion, comprising the second portion 78, extends circumferentially around the center axis A for a second arc length 88. This provides for a different weight distribution of the balancing ring 68 about the axis A as there is more material in the a cross-section of the ring 68 in the second portion 78 than in a cross-section in the first portion 76. Thus, the first portion 76 for the first arc length 86 comprises a minimum weight location while the second portion 78 for the second arc length 88 comprises a maximum weight location. In one example, the second arc length 88 is less than the first arc length 86. The transition can be linear or some other shape such that the arc sectors are not necessarily 120 degrees.

In one example, the balancing ring 68 is positioned eccentric to the hub 64. In other words, a center of the balancing ring 68 is offset or radially spaced from the center axis A about which the hub 64 rotates. In one example, the balancing ring 68 has eccentric heavier weighted material on the second portion 78 as described above.

In one example, the pinion gear 70 is selectively moveable between a locked position (FIGS. 6 and 7) where the balancing ring 68 is prevented from rotating, and an unlocked position (FIGS. 3 and 5) where the balancing ring 68 can rotate relative to the hub 64. In one example, the hub 64 includes a first set of lock features 90 and the pinion gear 70 includes a second set of lock features 92 that engage with the first set of lock features 90 when the pinion gear 70 is in the locked position.

Figure 5:
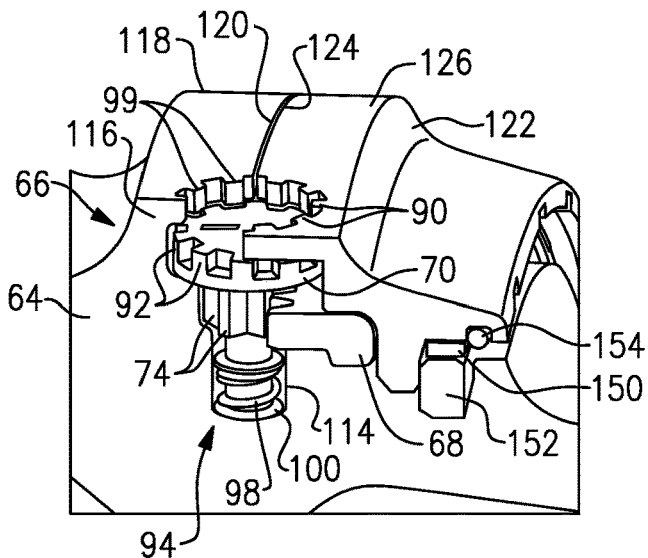
FIG. 5 is a perspective view similar to FIG. 3 but with a cover.
Figure 6:
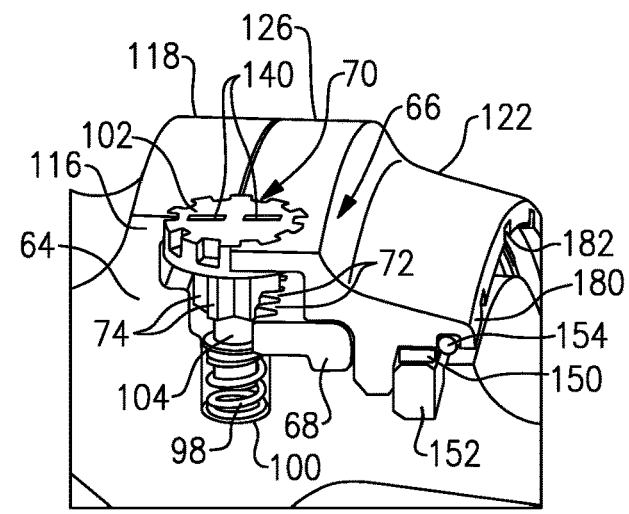
FIG. 6 is similar to FIG. 5 but shows the pinion gear in a locked position.
Figure 7:
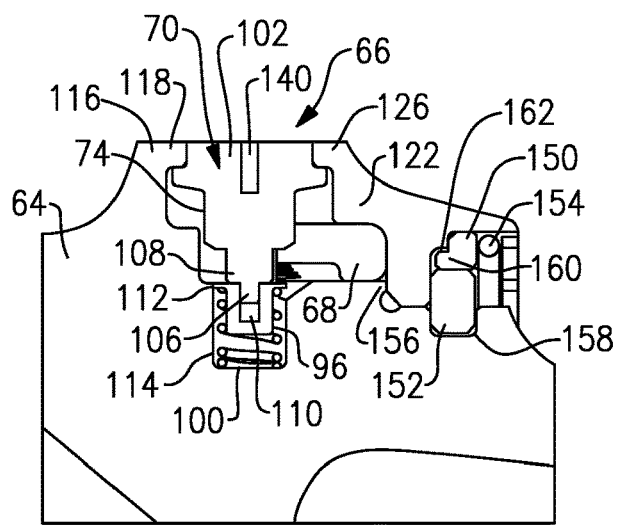
FIG. 7 is a section view of FIG. 6.
Figure 8:
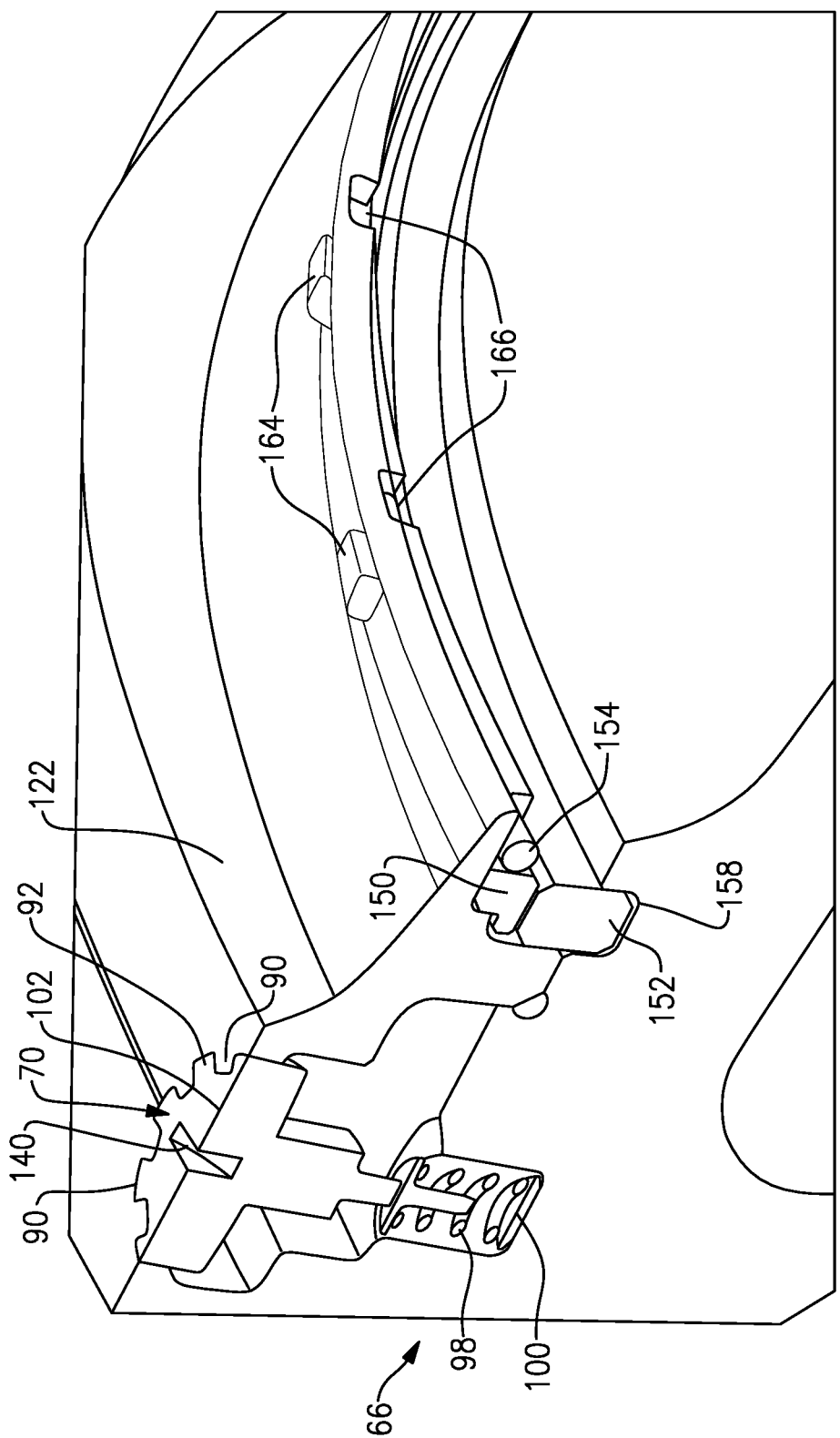
FIG. 8 is a perspective view showing a retainer that holds the cover on the rotor hub.

In one example, the pinion gear 70 is resiliently biased to the locked position. FIGS. 5-7 show an example of a biasing assembly 94 that is coupled to a radially inner end of the pinion gear 70. In one example, the biasing assembly 94 comprising a fitting 96, a resilient member 98, and a thrust washer 100.

In one example, the pinion gear 70 comprises a head portion 102, a toothed portion with the plurality of gear teeth 74, and a shaft portion 104 that extends from the toothed portion to a distal end 106 (FIG. 7). The distal end 106 of the shaft portion 104 comprises a reduced cross-section compared to the cross-section at the toothed portion and thus forms a shoulder 108 between the two sections. This reduced section distal end 106 is received within an internal cavity 110 of the fitting 96. The fitting 96 includes a flange 112 that is seated on the shoulder 108. The hub 64 includes a bore 114 with an end face that seats the thrust washer 100. In one example, the resilient member 98 comprises a coil spring that has one end seated against the flange 112 and an opposite end reacting against the thrust washer 100. The resilient member 98 biases the pinion gear 70 to the locked position.

In one example, the head portion 102 of the pinion gear 70 has an outer peripheral dimension that is greater than an outer peripheral dimension of the gear teeth 74. In one example, the second set of lock features 92 is formed about an outer periphery of the head portion 102. In one example, the second set of lock features 92 comprise a first set of castellations.

In one example, the hub 64 includes a shelf 116 having an outer surface 118 that extends to a shelf edge 120. In one example configuration, the balancing system 66 includes a cover 122 that extends to a cover edge 124 that is generally flush with the shelf edge 120. Additionally, an outer surface 126 of the cover 122 is generally flush with the outer surface 118 of the shelf 116. The cover 122 cooperates with the shelf 118 to enclose the balancing system 66 cavity and cover the balancing ring 68. The respective flush surfaces 118, 126 of the shelf 116 and cover 122 provide a non-interrupted surface at their associated mating region which significantly reduces local air and component heat up due to air windage.

In one example, the shelf edge 120 and the cover edge 124 cooperate with each other to provide the first set of lock features 90, which surround the head portion 102 of the pinion gear 70. In one example, the first set of lock features 90 comprise a second set of castellations that mate with the first set of castellations as shown in FIG. 6 when the pinion gear 70 is in the locked position. As shown in FIG. 7, the pinion gear 70 does not extend radially outward of the outer surfaces 118, 126 of the shelf 116 or cover 122 when in the locked position. This also reduces the air windage effect.

The pinion to ring gear teeth cannot be a miter type gear set because the pinion gear teeth need to be able to slide from a disengaged/locked position to an engaged position, and then back again. In one example, the pinion gear 70 is pushed radially, or substantially radially, inwardly in response to a tool input force against a biasing force of the resilient member 98 such that the first set of lock features 90 disengages from the second set of lock features 92 (FIG. 5) to allow the pinion gear 70 to rotate the balancing ring 68 to a desired adjustment position. This adjustment can occur during engine assembly, as well as on-wing during maintenance operations. In one example, in-line locking bore scope plug access, associated with the pinion gear 70 as indicated at 130 (FIG. 2), is accessible through an access port 132 formed in an engine casing 134 that surrounds the rotor 60. This allows a tool to interface with the adjustment pinion 70. In one example, the access port 132 is a bolted plug type access port as shown in FIG. 2.

In one example, the pinion gear 70 is at substantially 90 degrees relative to the ring 68; however, this can vary between +/−45 degrees, provided the ring gear teeth 72 are substantially 90 degrees to the pinion gear teeth 74. In one example, the pinion gear rotates about an axis that is non-concentric with the ring 68. Additionally, the ring teeth and the pinion teeth could be at an angle, as long as they are straight teeth.

In one example method, the eccentric geared balancing ring 68 is indexed by the spring-loaded geared pinion 70 through small increments of adjustment. In one example, if engine vibration is encountered in the field, a high spool rotation is performed to determine a balance correction sector mass and angular location. Those skilled in the art who have the benefit of this description will be able to determine the balance correction sector mass and angular location based on the engine performance. Once this is determined, the pinion gear 70 is then pushed inward, by a screw driver type tool or other similar tool (not shown), to overcome the biasing force of the resilient member 98 and move the pinion gear 70 to the unlocked position. In one example, an end face of the head portion 102 of the pinion gear 70 includes slots or recesses 140 to engage with the tool. The pinion gear 70 is then incrementally rotated by a tool that fits through several access ports 130, 132 until the gear balancing ring 68 is in the desired adjustment position. In one example, timing marks 136 are provided on the pinion gear 70 and the hub 64, as well as on the tool, to determine number of turns needed to achieve the desired adjustment position. The tool is then withdrawn, and the pinion gear 70 pops outward via the biasing force to engage the first and second sets castellations and lock both the pinion gear 70 and the gear balancing ring 68 from rotation. Centrifugal loading also provides this function. In this position, the use of the continuous forward hub shelf 116 and the cover 122 provides a shield to prevent windage heat up.

In one example, the balancing system 66 is moved to a location on the rear HPC hub 64 to further ease the access procedure. The increase in radial height location also increases a centrifugal load of the heavy material and allows for smaller adjustments.

In one example, a capture plate 150 and retainer assembly are used to hold the cover 122 on the hub 64. In one example, the retainer assembly is comprised of a locking split ring 152 and a split lock wire ring 154. The following is an example method of assembling the cover 122 to the hub 64. First, the cover 122 is slid onto the hub 64 and is seated against a shoulder 156. Next, the split ring 152 is pulled apart against its biasing force and installed within a groove 158 adjacent to the shoulder 156. The split ring 152 is then released with the biasing force resiliently retaining the split ring 152 against the cover 122 and hub 64. Next, the capture plate 150 is installed to fit between an outer surface of the split ring 152 and an inner surface of the cover 122. In one example, the capture plate 150 includes a recess 160 that receives a shoulder or lip 162 of the cover 122. In one example, an outer peripheral surface of the capture plate 150 includes protrusions or tabs 164 that fit into corresponding recesses or cutout castellations 166 formed within an inner surface of the cover 122. The positions of the recesses and protrusions could also be reversed. Finally, the split lock wire ring 154, is installed by compressing it to a smaller diameter against its biasing force to clear shelf lip 180 on cover 122, or in another embodiment spirally fed in through a loading slot 182 in cover 122 against the capture plate 150 to resiliently hold the plate 150 against the cover 122.

Although embodiment have been disclosed, a worker of skill in this art would recognize that modification would come within the scope of this disclosure. For that reason, the following claims should be studied to determine the true scope and content of this disclosure.

What is claimed is:

1. A balancing system comprising:
   a rotor hub having a center axis;
   a balancing ring surrounding the rotor hub, the balancing ring including a plurality of ring teeth, wherein the balancing ring has a first portion defining a first weight characteristic, a second portion defining a second weight characteristic that is greater than the first weight characteristic, and an inner peripheral surface, and wherein the first portion comprises a section of the balancing ring where a portion of the inner peripheral surface is spaced from an outer peripheral surface of the rotor hub by a gap, and wherein the second portion comprises a section of the balancing ring that does not include the gap; and
   a pinion gear including a plurality of gear teeth in meshing engagement with the plurality of ring teeth, wherein the pinion gear is selectively rotated to adjust a position of the balancing ring relative to the rotor hub.

2. The balancing system of claim 1, wherein the first portion extends circumferentially around the center axis for a first arc length and the second portion extends circumferentially around the center axis for a second arc length that is less than the first arc length.

3. The balancing system of claim 1, wherein the pinion gear is selectively moveable between a locked position where the balancing ring is prevented from rotating and an unlocked position where the balancing ring can rotate relative to the rotor hub.

4. The balancing system of claim 3, wherein the rotor hub includes a first set of lock features, and wherein the pinion gear includes a second set of lock features that engage with the first set of lock features when the pinion gear is in the locked position.

5. The balancing system of claim 3, wherein the pinion gear is resiliently biased to the locked position.

6. A balancing system comprising:
   a rotor hub having a center axis;
   a balancing ring surrounding the rotor hub, the balancing ring including a plurality of ring teeth; and
   a pinion gear including a plurality of gear teeth in meshing engagement with the plurality of ring teeth, wherein the pinion gear is selectively rotated to adjust a position of the balancing ring relative to the rotor hub, wherein the rotor hub comprises a compressor rotor hub and includes a shelf having an outer surface that extends to a shelf edge, and including a cover that extends to a cover edge that is generally flush with the shelf edge, and wherein the pinion gear does not extend radially outward of the shelf or cover.

7. The balancing system of claim 6, wherein the balancing ring has a first portion defining a first weight characteristic and a second portion defining a second weight characteristic that is greater than the first weight characteristic.

8. The balancing system of claim 7, wherein the balancing ring has an inner peripheral surface, and wherein the first portion comprises a section of the balancing ring where a portion of the inner peripheral surface is spaced from an outer peripheral surface of the rotor hub by a gap, and wherein the second portion comprises a section of the balancing ring that does not include the gap.

9. The balancing system of claim 7, wherein the first portion extends circumferentially around the center axis for a first arc length and the second portion extends circumferentially around the center axis for a second arc length that is less than the first arc length.

10. The balancing system of claim 6, wherein the pinion gear is selectively moveable between a locked position where the balancing ring is prevented from rotating and an unlocked position where the balancing ring can rotate relative to the rotor hub, and the rotor hub includes a first set of lock features, and wherein the pinion gear includes a second set of lock features that engage with the first set of lock features when the pinion gear is in the locked position.

11. A gas turbine engine comprising:
a compressor section, a combustor, and a turbine section;
the compressor section having at least one compressor rotor comprising a hub supporting at least one row of blades for rotation about an engine center axis;
a balancing ring surrounding the hub, the balancing ring including a plurality of ring teeth; and
a pinion gear including a plurality of gear teeth in meshing engagement with the plurality of ring teeth, wherein the pinion gear is selectively rotated to adjust a position of the balancing ring relative to the hub, wherein the pinion gear is selectively moveable between a locked position where the balancing ring is prevented from rotating and an unlocked position where the balancing ring can rotate relative to the hub, and wherein the pinion gear is resiliently biased to the locked position.

12. The gas turbine engine of claim 11, wherein the hub includes a shelf having an outer surface that extends to a shelf edge, and including a cover that extends to a cover edge that is generally flush with the shelf edge, and wherein the pinion gear includes a first set of lock features and the shelf and cover provide a second set of lock features that receive the first set of lock features with the pinion gear is in the locked position, and wherein the pinion gear does not extend radially outward of the shelf or cover when in the locked position.

13. The gas turbine engine of claim 12, wherein said pinion gear is pushed radially inwardly in response to a tool input force against a biasing force such that the first set of lock features disengages from the second set of lock features to allow the pinion gear to rotate the balancing ring to a desired adjustment position.

14. The gas turbine engine of claim 12, including a capture plate and retainer to hold the cover on the hub, wherein one of the cover and the capture plate includes protrusions and the other of the cover and the capture plate includes recesses to receive the protrusions.

15. The gas turbine engine of claim 11, wherein the balancing ring has a first portion defining a first weight characteristic and a second portion defining a second weight characteristic that is greater than the first weight characteristic such that a center of the balancing ring is offset from the engine center axis.

16. The gas turbine engine of claim 11, including an engine casing extending around the at least one compressor rotor, and wherein the pinion gear is accessible through an access port formed within the engine casing.

17. A method comprising:
installing a balancing ring to surround a rotor hub that rotates about a center axis;
engaging gear teeth of a pinion gear with ring teeth on the balancing ring; and
selectively rotating the pinion gear to adjust a position of the balancing ring relative to the rotor hub, wherein rotating the balancing ring includes offsetting a center of the balancing ring from the center axis.

18. The method of claim 17, including moving the pinion gear from a locked position where the pinion gear is prevented from rotating to an unlocked position to allow the pinion gear to rotate the balancing ring to a desired adjustment position.

19. The method of claim 17, including accessing the pinion gear through an access port provided on an engine casing that surrounds the rotor hub.

20. The method of claim 17, including rotating the pinion gear about an axis that is non-concentric with the center axis, installing a cover on the rotor hub, and installing a retainer to hold the cover on the rotor hub such that an edge of the cover is flush with an edge on the rotor hub and such that the pinion gear does not extend radially outward of the rotor hub or cover.

* * * * *